(12) United States Patent

Hu et al.

(10) Patent No.: US 12,596,046 B2

(45) Date of Patent: Apr. 7, 2026

(54) METHOD AND SYSTEM FOR AUTOMATICALLY MONITORING AND IDENTIFYING WATER SEEPAGE OF SEGMENT JOINT OF SUBWAY SHIELD TUNNEL

(71) Applicants: Shijiazhuang Tiedao University, Shijiazhuang City (CN); SJZ Traffic Investment Dev. Co., Ltd., Shijiazhuang City (CN); SJZ Transportation Investment Dev. Group Co., Ltd., Shijiazhuang City (CN); Shijiazhuang Institute of Railway Technology, Shijiazhuang City (CN)

(72) Inventors: Zhinan Hu, Shijiazhuang City (CN); Huibin Wang, Shijiazhuang City (CN); Shuopeng Meng, Shijiazhuang City (CN); Yonggang Wang, Shijiazhuang City (CN); Zhanliang Liu, Shijiazhuang City (CN); Shang Gao, Shijiazhuang City (CN); Haining Guan, Shijiazhuang City (CN); Biao Li, Shijiazhuang City (CN); Guangxian Sun, Shijiazhuang City (CN); Yadong Sun, Shijiazhuang City (CN); Wenkai Chai, Shijiazhuang City (CN); Jiancheng Zhou, Shijiazhuang City (CN)

(73) Assignees: Shijiazhuang Tiedao University, Shijiazhuang City (CN); SJZ Traffic Investment Dev. Co., Ltd., Shijiazhuang City (CN); SJZ Transportation Investment Dev. Group Co., Ltd., Shijiazhuang City (CN); Shijiazhuang Institute of Railway Technology, Shijiazhuang City (CN)

( * ) Notice: Subject to any disclaimer, the term of this patent is extended or adjusted under 35 U.S.C. 154(b) by 311 days.

(21) Appl. No.: 18/533,364

(22) Filed: Dec. 8, 2023

(65) Prior Publication Data

US 2024/0192074 A1     Jun. 13, 2024

(30) Foreign Application Priority Data

Dec. 9, 2022     (CN) .......................... 202211589343.7

(51) Int. Cl.
| | |
|---|---|
| *G01M 3/04* | (2006.01) |
| *E02D 33/00* | (2006.01) |

(Continued)

(52) U.S. Cl.
CPC ............... *G01M 3/04* (2013.01); *E02D 33/00* (2013.01); *G06T 7/0002* (2013.01); *G06T 7/90* (2017.01);

(Continued)

(58) Field of Classification Search
CPC ...... G01M 3/04; E02D 33/00; E02D 2600/10; G06T 7/0002; G06T 7/90; G06T 2207/30232; G06T 2207/30184
See application file for complete search history.

(56) References Cited

U.S. PATENT DOCUMENTS

| | | | | | |
|---|---|---|---|---|---|
| 2,133,059 | A | * | 10/1938 | Snelling ................. | E01C 11/02 |
| | | | | | 73/146 |
| 7,661,232 | B2 | * | 2/2010 | Smith ................... | E04B 1/6801 |
| | | | | | 52/396.04 |

(Continued)

FOREIGN PATENT DOCUMENTS

| | | | | | | |
|---|---|---|---|---|---|---|
| CN | 107815188 | A | * | 3/2018 | ........... | C09D 131/04 |
| CN | 110878700 | A | * | 3/2020 | ............. | E21D 11/38 |

(Continued)

OTHER PUBLICATIONS

Solomon, M, "The use of cobalt salts as indicators of humidity and moisture", Annals of Applied Biology, vol. 32, Iss 1, Feb. 1945, <https://doi.org/10.1111/j.1744-7348.1945.tb06763.x> (Year: 1945).*

(Continued)

*Primary Examiner* — Jonathan M Dunlap

(74) *Attorney, Agent, or Firm* — Thomas | Horstemeyer, LLP

(57)     ABSTRACT

The present disclosure provides a method and system for automatically monitoring and identifying water seepage of a (Continued)

segment joint of a subway shield tunnel. The method includes: 1): grinding a water-sensitive material and then mixing with a waterproof material to form a color-developing agent; 2): coating the color-developing agent on two sides extending from a construction joint and/or a deformation joint of a tunnel lining as a center line, to form a color-developing layer; and 3) obtaining a color development feature of the color-developing layer, and identifying water seepage based on the color development feature. According to the present disclosure, a water seepage amount can be determined based on the color development feature of the color-developing layer around the construction joint and/or the deformation joint of the tunnel lining, which facilitates monitoring of the water seepage amount around the construction joint and/or the deformation joint.

10 Claims, 3 Drawing Sheets

(51) Int. Cl.
  *G06T 7/00*        (2017.01)
  *G06T 7/90*        (2017.01)

(52) U.S. Cl.
  CPC ..................... *E02D 2600/10* (2013.01); *G06T 2207/30184* (2013.01); *G06T 2207/30232* (2013.01)

(56)            References Cited

U.S. PATENT DOCUMENTS

| | | | |
|---|---|---|---|
| 12,209,972 B2 * | 1/2025 | Horita | G01N 21/8851 |
| 2023/0003663 A1 * | 1/2023 | Horita | G01N 21/8851 |

FOREIGN PATENT DOCUMENTS

| | | | | |
|---|---|---|---|---|
| CN | 217211285 U | * | 8/2022 | |
| JP | 2002188998 A | * | 7/2002 | |
| KR | 20100051371 A | * | 5/2010 | B65D 90/04 |
| WO | WO-2020121917 A1 | * | 6/2020 | G06T 11/60 |

OTHER PUBLICATIONS

Thompson et al., "DryCardTM—A Low-Cost Dryness Indicator for Dried Products", AIMS Agriculture and Foods, vol. 2, Iss 4, 2017 , <https://www.aimspress.com/article/doi/10.3934/agrfood.2017.4.339> (Year: 2017).*

* cited by examiner

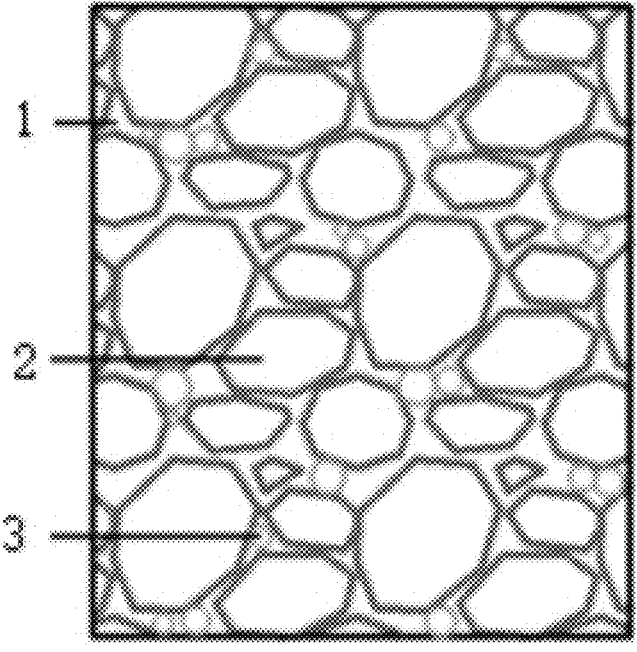

Grind and then mix a water-sensitive material and a waterproof material to form a color-developing agent Coat the color-developing agent on two sides extending from a construction joint and/or a deformation joint of a tunnel lining as a center line, to form a color-developing layer Obtain a color development feature of the color-developing layer, and determine a water seepage level based on the color development feature

FIG. 2

| Coating color | Blue | Baby blue | Bluish violet | Purple | Light purple | Light pink |
|---|---|---|---|---|---|---|
| Water content (%) of a coating | <7 | 7~31.5 | 31.5~42 | 42~52.5 | 52.5~66.5 | >66.5 |
| Water seepage level | Level 0 (no water seepage) | Level 1 (relatively mild) | Level 2 (mild) | Level 3 (intermediate) | Level 4 (relatively severe) | Level 5 (severe) |

| Color development feature | White | Sky blue | Baby blue | Ocean blue | Blue | Dark blue |
|---|---|---|---|---|---|---|
| Water content (%) of a color-developing layer | <10 | 10~18.4 | 18.4~25.2 | 25.2~31 | 31~45.3 | >45.3 |
| Water seepage level | Level 0 | Level 1 | Level 2 | Level 3 | Level 4 | Level 5 |

FIG. 5

METHOD AND SYSTEM FOR AUTOMATICALLY MONITORING AND IDENTIFYING WATER SEEPAGE OF SEGMENT JOINT OF SUBWAY SHIELD TUNNEL

CROSS REFERENCE TO RELATED APPLICATION

This patent application claims the benefit and priority of Chinese Patent Application No. 202211589343.7, filed with the China National Intellectual Property Administration on Dec. 9, 2022, the disclosure of which is incorporated by reference herein in its entirety as part of the present application.

TECHNICAL FIELD

The present disclosure relates to the technical field of civil engineering, and relates to a subway shield technology, and in particular, to a method and system for automatically monitoring and identifying water seepage of a segment joint of a subway shield tunnel.

BACKGROUND

Local water seepage is likely to occur at a segment joint of a subway shield tunnel, and may affect normal operation of the subway shield tunnel as one of the main diseases of the subway shield tunnel. The occurrence of water seepage may change an internal force of a tunnel lining. For the tunnel itself, the water seepage may affect structural stability of the tunnel and driving safety. For facilities and equipment attached to the tunnel, water seepage may accelerate corrosion of the equipment, leading to equipment failure and shortened service life. For an external structure of the tunnel, the water seepage may pose a long-term threat to ground buildings and underground pipelines.

Currently, many subway shield tunnels built in China have serious water seepage, and subway sections subjected to water seepage account for about 30% of a tunnel length. Long-term water seepage may change the tunnel from progressive failure to sudden failure, which may affect healthy operation and service life of the tunnel. Currently, there are mainly the following several existing methods for monitoring water seepage of a subway shield: (1) An image of a tunnel segment is collected by using infrared rays, and the like, and the collected image is analyzed and processed to obtain information about water seepage, which is high in cost and cannot prevent further deterioration of the water seepage. (2) An electrode array is laid on an inner wall of a tunnel, and information about water seepage is obtained by measuring resistivity of the electrode array. Although this method can reduce a lot of manpower consumption, since an electrical conductor is in contact with corrosive seeped water for a long time, measured data may be wrong or even the electrical conductor may be destroyed, and it takes a lot of money to maintain a semiconductor. Therefore, currently, it is impossible to prevent deterioration of water seepage of a tunnel segment while monitoring the water seepage.

SUMMARY

Against the above problem that currently, it is impossible to prevent deterioration of water seepage of a tunnel segment while monitoring the water seepage, the present disclosure provides a method and system for automatically monitoring and identifying water seepage of a segment joint of a subway shield tunnel.

According to the present disclosure, a waterproof material and a water-sensitive material are mixed and then sprayed near a joint of two adjacent tunnel segments to form a color-developing layer. During water seepage, the color-developing layer may change from blue to pink for color development representation when encountered with water, and the representation phenomenon is collected to determine water seepage at the joint of the tunnel segments, with a specific technical solution as follows:

A method for automatically monitoring and identifying water seepage of a segment joint of a subway shield tunnel includes the following steps:

1): grinding a water-sensitive material and then mixing with a waterproof material to form a color-developing agent;

2): coating the color-developing agent on two sides extending from a construction joint and/or a deformation joint of a tunnel lining as a center line, to form a color-developing layer; and 3) obtaining a color development feature of the color-developing layer, and identifying water seepage based on the color development feature, where a process of obtaining the color development feature includes: collecting color-developing image information, and extracting the color development feature of the image information by using a target recognition algorithm.

Further, the water-sensitive material is cobalt chloride or anhydrous copper sulfate.

Further, when the water-sensitive material is cobalt chloride, a relationship between the color development feature and water seepage in step 3) is as follows:

when the color development feature is blue, a corresponding water content of the color-developing layer is less than 7%, and a water seepage level is 0;

when the color development feature is baby blue, a corresponding water content of the color-developing layer is greater than or equal to 7% and less than 31.5%, and the water seepage level is 1;

when the color development feature is bluish violet, a corresponding water content of the color-developing layer is greater than or equal to 31.5% and less than 42%, and the water seepage level is 2;

when the color development feature is purple, a corresponding water content of the color-developing layer is greater than or equal to 42% and less than 52.5%, and the water seepage level is 3;

when the color development feature is light purple, a corresponding water content of the color-developing layer is greater than or equal to 52.5% and less than 66.5%, and the water seepage level is 4; and when the color development feature is light pink, a corresponding water content of the color-developing layer is greater than or equal to 66.5%, and the water seepage level is 5.

Further, when the water-sensitive material is anhydrous copper sulfate, the relationship between the color development feature and water seepage in step 3) is as follows:

when the color development feature is colorless, a corresponding water content of the color-developing layer is less than 10%, and the water seepage level is 0;

when the color development feature is light blue, a corresponding water content of the color-developing layer is greater than or equal to 10% and less than 18.4%, and the water seepage level is 1;

when the color development feature is baby blue, a corresponding water content of the color-developing layer is greater than or equal to 18.4% and less than 25.2%, and the water seepage level is 2;

when the color development feature is indigo, a corresponding water content of the color-developing layer is greater than or equal to 25.2% and less than 31%, and the water seepage level is 3;

when the color development feature is blue, a corresponding water content of the color-developing layer is greater than or equal to 31% and less than 45.3%, and the water seepage level is 4; and when the color development feature is dark blue, a corresponding water content of the color-developing layer is greater than or equal to 45.3%, and the water seepage level is 5.

Further, a weight ratio of the waterproof material to the water-sensitive material is 1:(5-15).

Further, the color-developing layer extends outward by 30 cm along the center line of the construction joint and/or the deformation joint of the tunnel lining.

Further, air is mixed between the waterproof material and the water-sensitive material in the color-developing layer.

Further, the water-sensitive material has a nanometer particle size after being ground.

Further, the waterproof material is a one-component polyurethane waterproof coating or a pure acrylic polymer emulsion or silane impregnated coating: and the water-sensitive material is cobalt chloride or anhydrous copper sulfate.

A system for automatically monitoring and identifying water seepage of a segment joint of a subway shield tunnel that is formed based on the above method for automatically monitoring and identifying water seepage of a segment joint of a subway shield tunnel is provided, including a color-developing layer arranged around a center line of a construction joint and/or a deformation joint of a tunnel lining, where the color-developing layer extends outward by 30 cm along the construction joint and/or the deformation joint.

Further, the color-developing layer includes a sealed color-developing layer, an intermediate color-developing layer and an edge-sealing color-developing layer that are sequentially arranged in parallel from inside to outside along the center line of the construction joint and/or the deformation joint, where the sealed color-developing layer has a thickness of 4-5 mm, the intermediate color-developing layer has a thickness that is 80% of the thickness of the sealed color-developing layer, and the color-developing layer extends outward by 30 cm along the center line of the construction joint and/or the deformation joint.

Compared with the prior art, the present disclosure has the following beneficial effects:

1. In the method for automatically monitoring and identifying water seepage of a segment joint of a subway shield tunnel according to the present disclosure, a waterproof material and a water-sensitive material form a color-developing agent. The waterproof material not only provides a function of sealing and waterproofing a construction joint and/or a deformation joint of a tunnel lining, but also provides a function of solidifying the water-sensitive material. The color-developing agent is coated around the construction joint and/or the deformation joint of the tunnel lining, so that different color development features can be formed around the construction joint and/or the deformation joint of the tunnel lining based on a change in water seepage amount, and then whether water seepage occurs around the construction joint and/or the deformation joint and the water seepage amount are determined. This facilitates monitoring of the water seepage amount around the construction joint and/or the deformation joint, and can provide guidance for a maintenance operator.

2. A color-developing layer extends by 30 cm outward along a center line of the construction joint and/or the deformation joint of the tunnel lining, which can provide a good sealing and waterproof function at the beginning. When water seepage occurs in a later stage, a main region subjected to water seepage can be determined based on color development features of different parts.

3. Air is mixed between the waterproof material and the water-sensitive material in the color-developing layer to form small bubbles, which provide a certain accommodation space for water and increase a contact area between the water-sensitive material and moisture, that is, full contact is implemented, thereby increasing a sensitivity of a reaction between the water-sensitive material and the moisture.

4. The water-sensitive material has a nanometer particle size after being ground. A smaller particle size of the water-sensitive material indicates a greater color change sensitivity and higher color development accuracy.

5. The color-developing layer includes a sealed color-developing layer, an intermediate color-developing layer and an edge-sealing color-developing layer that are sequentially arranged in parallel from inside to outside along the center line of the construction joint and/or the deformation joint, where thicknesses of the sealed color-developing layer, the intermediate color-developing layer and the edge-sealing color-developing layer sequentially decrease. With this setting, the material can be saved to a certain extent while the sealing and waterproofing of the construction joint and/or the deformation joint can be ensured.

BRIEF DESCRIPTION OF THE DRAWINGS

FIG. 1 is a micrograph of a color-developing layer formed by polyurethane and cobalt chloride:

FIG. 2 is a schematic working diagram of spraying of a color-developing layer:

FIG. 5 is a diagram showing a relationship between a color development feature of a color-developing layer and a water seepage level when a water-sensitive material is anhydrous copper sulfate.

Figures 3, 4:
FIG. 3 is a schematic diagram showing longitudinal joints and circumferential joints of tunnel segments.
FIG. 4 is a diagram showing a relationship between a color development feature of a color-developing layer and a water seepage level when a water-sensitive material is cobalt chloride.

1—Waterproof material, 2—Water-sensitive material, 3—Air interlayer.

DETAILED DESCRIPTION OF THE EMBODIMENTS

The technical solutions of the present disclosure will be further explained below with reference to the accompanying drawings and embodiments, but the present disclosure is not limited to the implementations described below.

Before spraying, parts to be subjected to spraying (around construction joints and/or deformation joints of a tunnel lining) need to be pretreated, with a pretreatment process including the following steps.

1: Blow clean peripheries of all construction joints and deformation joints with compressed air to remove loose impurities, dust, and the like around the construction joints and the deformation joints, which can effectively improve a coating rate of a coating and reduce costs; and if there are scum and mud on surfaces around the construction joints and the deformation joints, wash out the scum and mud with high-pressure water, clean out floating dust, oil stains, and the like on a concrete surface of a tunnel, and then stand for stand for drying of the surface to ensure dryness of an inner wall of the tunnel.

2: Repair uneven parts to ensure flatness of the tunnel concrete surface; and apply mortar to plaster parts of the concrete surface that are particularly smooth.

3: Repair parts subjected to water seepage to stop the water seepage.

4: Before construction using a shotcrete machine, check the construction machine, to determine whether a pipeline is unobstructed, whether the machine is running normally, whether an air pressure can meet requirements, and the like.

Embodiment 1

Referring to FIG. 2, a method for automatically monitoring and identifying water seepage of a segment joint of a subway shield tunnel according to this embodiment includes the following steps.

1): Grind a water-sensitive material 2 and then mix with a waterproof material 1 to form a color-developing agent: specifically, wet a solid surface of the water-sensitive material 2, then disperse associated particles (break a binding force) by a grinding machine, to stabilize smaller particles, then polish the water-sensitive material 2 by a polishing machine until the particles are within 100 microns, which generally takes 15-30 min, and then perform the next step of finer grinding; continue to grind cobalt chloride to a nanometer level by a basket bead mill, and evenly mix the ground water-sensitive material 2 and the waterproof material 1 to form a color-developing agent.

2): Referring to FIG. 3, which is a schematic diagram of a construction joint and/or a deformation joint of a tunnel lining, coat the color-developing agent on two sides extending from the construction joint and/or the deformation joint of the tunnel lining as a center line, to form a color-developing layer: specifically, clean a small wet shotcrete machine, and place the color-developing agent in step 1) into the small wet shotcrete machine: during operation of the wet shotcrete machine, due to a need to follow a construction principle of introducing air before introducing a material, spray the color-developing agent from a nozzle before effectively controlling and adjusting a spraying distance and an air pressure; when the wet shotcrete machine stops operating, due to a need to follow a principle of first stopping introducing the material, then shutting down a device and finally stopping introducing the air, blow away a small amount of residual color-developing agent at the nozzle by the air before stopping introducing the air; spray from a waist to a top of the tunnel (from bottom to top) by the small wet shotcrete machine: since water seepage most occurs in parts of the construction joint and the deformation joint of the lining, extend by 30 cm toward two sides with the construction joint and the deformation joint of the tunnel lining as center lines, with a spraying thickness of about 1 mm each time: and after the color-developing agent sprayed for the first time is substantially dried completely, continue to spray for the second time, so that an internal coating is fully dried, so as to ensure a in function of the coating. The above operations are repeated to make the total thickness of waterproof coating reach 4-5 mm. Since there is a higher probability of water seepage at a position near a joint, the thickness may be appropriately increased by 1-2 mm each time advancing toward the inner side is performed by 10 cm, so that the material has a certain ability to resist slight vibration and a certain degree of displacement of a base layer while reflecting that the water-sensitive material 2 changes a color when encountered with water, thus making the coating have a longer service life, reducing maintenance times, and reducing use costs. Since the surface subjected to spraying is not smooth enough, after the last spraying, it is necessary to manually fill, level and trim the coating immediately to make the coating surface smooth, ensure that the coating reaches a design thickness, and facilitate subsequent color observation. After the base layer is completed, the coating surface is required to be flat, smooth and clean.

3): Obtain a color development feature of the color-developing layer, and determine a water seepage level based on the color development feature.

A weight ratio of the waterproof material 1 to the water-sensitive material 2 in this embodiment is 1:(5-15). Specifically, the weight ratio of the waterproof material 1 to the water-sensitive material 2 may be 1:5, 1:6, 1:7, 1:8, 1:9, 1:10, 1:11, 1:12, 1:13, 1:14, or 1:15. Preferably, the weight ratio of the waterproof material 1 to the water-sensitive material 2 is 1:10.

Preferably, the color-developing layer extends outward by 30 cm along the construction joint and/or the deformation joint of the tunnel lining as the center line.

Referring to FIG. 1, air is mixed between the waterproof material 1 and the water-sensitive material 2 in the color-developing layer, to form an air interlayer 3.

Preferably, the water-sensitive material 2 in this embodiment has a nanometer particle size after being ground.

Embodiment 2

A method for automatically monitoring and identifying water seepage of a segment joint of a subway shield tunnel in this embodiment is formed based on Embodiment 1. Specifically, the waterproof material 1 is a one-component polyurethane waterproof coating or a pure acrylic polymer emulsion or silane impregnated coating. Referring to FIG. 4 (the coating layers are represented with red, green, blue (RGB) color codes, that is, various colors can be obtained by changes and superimposition of the red, green, and blue channels), a relationship between a color development feature and water seepage is described with a color-developing agent composed of the one-component polyurethane waterproof coating and cobalt chloride as an example.

When the color development feature is blue, a corresponding water content of the color-developing layer is less than 7%, and a water seepage level is 0;

when the color development feature is baby blue, a corresponding water content of the color-developing layer is greater than or equal to 7% and less than 31.5%, and the water seepage level is 1;

when the color development feature is bluish violet, a corresponding water content of the color-developing layer is greater than or equal to 31.5% and less than 42%, and the water seepage level is 2;

when the color development feature is purple, a corresponding water content of the color-developing layer is greater than or equal to 42% and less than 52.5%, and the water seepage level is 3;

when the color development feature is light purple, a corresponding water content of the color-developing layer is greater than or equal to 52.5% and less than 66.5%, and the water seepage level is 4; and when the color development feature is light pink, a corresponding water content of the color-developing layer is greater than or equal to 66.5%, and the water seepage level is 5.

A process of obtaining the color development feature includes: collecting color-developing image information, and extracting the color development feature of the image information by using a target recognition algorithm of the color feature. Specifically, a shield tunnel apparent inspection vehicle is used to travel in a forward track direction, the image information of the color-developing layer is collected by an industrial camera, and the color information of the color-developing layer on a segment is recorded. The industrial camera is fixed to the apparent inspection vehicle. The collected image information and color information are stored in a computer, to facilitate subsequent data sorting, statistics and viewing. Based on the collected image information, a color in an image is highlighted by using the target recognition algorithm of the color feature. The process includes the following steps.

a: Color space conversion: read the image information and filter; and convert the image from red green blue (RGB) to a hue saturation value (HSV) color space based on a formula.

b: Segmentation: establish a slider by using a create Trackbar function, and perform threshold segmentation on each channel after color space conversion; determine corresponding thresholds of various colors based on results of the threshold segmentation; perform threshold segmentation on the image based on different colors; perform mathematical statistics on the results of the threshold segmentation, determine the color of the image, and output classification results, as shown in the color classification table in Table 1.

TABLE 1

| | Black | Gray | White | Red | Orange | Yellow | Green | Cyan | Blue | Purple |
|---|---|---|---|---|---|---|---|---|---|---|
| | | | | Color classification table | | | | | | |
| hmin | 0 | 0 | 0 | 0/156 | 11 | 26 | 35 | 78 | 100 | 125 |
| hmax | 180 | 180 | 180 | 10/180 | 25 | 34 | 77 | 99 | 124 | 155 |
| smin | 0 | 0 | 0 | 43 | 43 | 43 | 43 | 43 | 43 | 43 |
| smax | 255 | 43 | 30 | 255 | 255 | 255 | 255 | 255 | 255 | 255 |
| vmin | 0 | 46 | 221 | 46 | 46 | 46 | 46 | 46 | 46 | 46 |
| vmax | 46 | 220 | 255 | 255 | 255 | 255 | 255 | 255 | 255 | 255 | c: Target color detection

Pre-process the image to eliminate noise and obtain a binary image: perform contour detection on the binary image: select, based on a task target, an appropriate polygon to describe a contour; after a polygonal region is obtained, capture an image of the region from the original image: perform color segmentation on the image in the polygonal region, perform statistics on the segmentation results, determine a color of the image, and output classification results.

Embodiment 3

A method for automatically monitoring and identifying water seepage of a segment joint of a subway shield tunnel in this embodiment is formed based on Embodiment 1. Specifically, the waterproof material 1 is a one-component polyurethane waterproof coating or a pure acrylic polymer emulsion or silane impregnated coating. Referring to FIG. 5 (the coating layers are represented with red, green, blue (RGB) color codes, that is, various colors can be obtained by changes and superimposition of the red, green, and blue channels), a relationship between a color development feature and water seepage is described with a color-developing agent composed of the pure acrylic polymer emulsion and anhydrous copper sulfate as an example.

When the color development feature is colorless, a corresponding water content of the color-developing layer is less than 10%, and the water seepage level is 0;

when the color development feature is light blue, a corresponding water content of the color-developing layer is greater than or equal to 10% and less than 18.4%, and the water seepage level is 1;

when the color development feature is baby blue, a corresponding water content of the color-developing layer is greater than or equal to 18.4% and less than 25.2%, and the water seepage level is 2;

when the color development feature is indigo, a corresponding water content of the color-developing layer is greater than or equal to 25.2% and less than 31%, and the water seepage level is 3;

when the color development feature is blue, a corresponding water content of the color-developing layer is greater than or equal to 31% and less than 45.3%, and the water seepage level is 4; and when the color development feature is dark blue, a corresponding water content of the color-developing layer is greater than or equal to 45.3%, and the water seepage level is 5.

Specifically, for a process of obtaining the color development feature, reference may be made to Embodiment 2.

Embodiment 4

A system for automatically monitoring and identifying water seepage of a segment joint of a subway shield tunnel according to this embodiment is formed based on the method for automatically monitoring and identifying water seepage of a segment joint of a subway shield tunnel according to Embodiment 1 or 2 or 3, and includes a color-developing layer arranged around a center line of a construction joint and/or a deformation joint of a tunnel lining, where the color-developing layer extends outward by 30 cm along the center line of the construction joint and/or the deformation joint.

The color-developing layer includes a sealed color-developing layer, an intermediate color-developing layer and an edge-sealing color-developing layer that are sequentially arranged in parallel from inside to outside along the construction joint and/or the deformation joint as the center line, where the sealed color-developing layer has a thickness of 4-5 mm, specifically, the sealed color-developing layer may have a thickness of 4 mm, 4.5 mm or 5 mm, the intermediate color-developing layer has a thickness that is 80% of the thickness of the sealed color-developing layer, and the edge-sealing color-developing layer has a thickness that is 80% of the thickness of the intermediate color-developing layer.

A weight ratio of the waterproof material 1 to the water-sensitive material 2 in this embodiment is 1:(5-15). Specifically, the weight ratio of the waterproof material 1 to the water-sensitive material 2 may be 1:5, 1:6, 1:7, 1:8, 1:9, 1:10, 1:11, 1:12, 1:13, 1:14, or 1:15. Preferably, the weight ratio of the waterproof material 1 to the water-sensitive material 2 is 1:10.

Referring to FIG. 1, air is mixed between the waterproof material 1 and the water-sensitive material 2 in the color-developing layer, to form an air interlayer 3.

Preferably, the water-sensitive material 2 in this embodiment has a nanometer particle size after being ground.

What is claimed is:

1. A method for automatically monitoring and identifying water seepage of a segment joint of a subway shield tunnel, comprising the following steps:
  1) grinding a water-sensitive material (2) and then mixing with a waterproof material (1) to form a color-developing agent;
  2) coating the color-developing agent on two sides extending from a construction joint and/or a deformation joint of a tunnel lining as a center line, to form a color-developing layer; and
  3) obtaining a color development feature of the color-developing layer, and identifying water seepage based on the color development feature, wherein
  a process of obtaining the color development feature comprises: collecting color-developing image information, and extracting the color development feature of the image information by using a target recognition algorithm.

2. The method for automatically monitoring and identifying water seepage of a segment joint of a subway shield tunnel according to claim 1, wherein the water-sensitive material (2) is cobalt chloride or anhydrous copper sulfate.

3. The method for automatically monitoring and identifying water seepage of a segment joint of a subway shield tunnel according to claim 2, wherein when the water-sensitive material (2) is cobalt chloride, a relationship between the color development feature and water seepage in step 3) is as follows:
  when the color development feature is blue, a corresponding water content of the color-developing layer is less than 7%, and a water seepage level is 0;
  when the color development feature is baby blue, a corresponding water content of the color-developing layer is greater than or equal to 7% and less than 31.5%, and the water seepage level is 1;

when the color development feature is bluish violet, a corresponding water content of the color-developing layer is greater than or equal to 31.5% and less than 42%, and the water seepage level is 2;
  when the color development feature is purple, a corresponding water content of the color-developing layer is greater than or equal to 42% and less than 52.5%, and the water seepage level is 3;
  when the color development feature is light purple, a corresponding water content of the color-developing layer is greater than or equal to 52.5% and less than 66.5%, and the water seepage level is 4; and
  when the color development feature is light pink, a corresponding water content of the color-developing layer is greater than or equal to 66.5%, and the water seepage level is 5.

4. The method for automatically monitoring and identifying water seepage of a segment joint of a subway shield tunnel according to claim 2, wherein when the water-sensitive material (2) is anhydrous copper sulfate, the relationship between the color development feature and water seepage in step 3) is as follows:
  when the color development feature is colorless, a corresponding water content of the color-developing layer is less than 10%, and the water seepage level is 0;
  when the color development feature is light blue, a corresponding water content of the color-developing layer is greater than or equal to 10% and less than 18.4%, and the water seepage level is 1;
  when the color development feature is baby blue, a corresponding water content of the color-developing layer is greater than or equal to 18.4% and less than 25.2%, and the water seepage level is 2;
  when the color development feature is indigo, a corresponding water content of the color-developing layer is greater than or equal to 25.2% and less than 31%, and the water seepage level is 3;
  when the color development feature is blue, a corresponding water content of the color-developing layer is greater than or equal to 31% and less than 45.3%, and the water seepage level is 4; and
  when the color development feature is dark blue, a corresponding water content of the color-developing layer is greater than or equal to 45.3%, and the water seepage level is 5.

5. The method for automatically monitoring and identifying water seepage of a segment joint of a subway shield tunnel according to claim 1, wherein a weight ratio of the waterproof material (1) to the water-sensitive material (2) is 1:(5-15).

6. The method for automatically monitoring and identifying water seepage of a segment joint of a subway shield tunnel according to claim 1, wherein the color-developing layer extends outward by 30 cm along the center line of the construction joint and/or the deformation joint of the tunnel lining.

7. The method for automatically monitoring and identifying water seepage of a segment joint of a subway shield tunnel according to claim 1, wherein air is mixed between the waterproof material (1) and the water-sensitive material (2) in the color-developing layer.

8. The method for automatically monitoring and identifying water seepage of a segment joint of a subway shield tunnel according to claim 1, wherein the waterproof material (1) is a one-component polyurethane waterproof coating or a pure acrylic polymer emulsion or silane impregnated coating.

9. A system for automatically monitoring and identifying water seepage of a segment joint of a subway shield tunnel that is formed based on the method for automatically monitoring and identifying water seepage of a segment joint of a subway shield tunnel according to claim 1, comprising a color-developing layer arranged around a center line of a construction joint and/or a deformation joint of a tunnel lining, wherein the color-developing layer extends outward by 30 cm along the center line of the construction joint and/or the deformation joint.

10. The system for automatically monitoring and identifying water seepage of a segment joint of a subway shield tunnel according to claim 9, wherein the color-developing layer comprises a sealed color-developing layer, an intermediate color-developing layer and an edge-sealing color-developing layer that are sequentially arranged in parallel from inside to outside along the center line of the construction joint and/or the deformation joint, wherein the sealed color-developing layer has a thickness of 4-5 mm, the intermediate color-developing layer has a thickness that is 80% of the thickness of the sealed color-developing layer, and the edge-sealing color-developing layer has a thickness that is 80% of the thickness of the intermediate color-developing layer.

* * * * *